(12) United States Patent
Rhee et al.

(10) Patent No.: US 9,921,073 B2
(45) Date of Patent: Mar. 20, 2018

(54) EYEWEAR-TYPE TERMINAL AND METHOD FOR CONTROLLING THE SAME

(71) Applicant: LG ELECTRONICS INC., Seoul (KR)

(72) Inventors: Jeongyoon Rhee, Seoul (KR); Taeseong Kim, Seoul (KR); Taekyoung Lee, Seoul (KR); Yujune Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 14/614,222

(22) Filed: Feb. 4, 2015

(65) Prior Publication Data
US 2015/0379360 A1    Dec. 31, 2015

(30) Foreign Application Priority Data
Jun. 26, 2014   (KR) .................. 10-2014-0079136

(51) Int. Cl.
| | |
|---|---|
| *G06T 19/00* | (2011.01) |
| *G01C 21/36* | (2006.01) |
| *G06F 3/01* | (2006.01) |
| *G02B 27/01* | (2006.01) |

(Continued)

(52) U.S. Cl.
CPC ....... *G01C 21/3602* (2013.01); *G01C 21/365* (2013.01); *G01C 21/3608* (2013.01); *G01C 21/3644* (2013.01); *G01C 21/3647* (2013.01); *G02B 27/017* (2013.01); *G06F 3/011* (2013.01); *G06F 3/012* (2013.01);

(Continued)

(58) Field of Classification Search
CPC .... G06T 19/006; G02B 27/0101; B60K 35/00
USPC .................. 345/7, 8; 348/113, 115, 116
See application file for complete search history.

(56) References Cited

U.S. PATENT DOCUMENTS

| | | | |
|---|---|---|---|
| 6,339,746 B1 | 1/2002 | Sugiyama et al. | |
| 8,977,489 B2 * | 3/2015 | Szczerba ............. | G01C 21/365 345/7 |

(Continued)

FOREIGN PATENT DOCUMENTS

| | | |
|---|---|---|
| DE | 102006057428 | 6/2008 |
| DE | 102008051756 | 5/2009 |

(Continued)

OTHER PUBLICATIONS

European Patent Office Application Serial No. 15150643.3, Search Report dated Nov. 17, 2015, 6 pages.

(Continued)

*Primary Examiner* — Chante Harrison
(74) *Attorney, Agent, or Firm* — Lee, Hong, Degerman, Kang & Waimey

(57) ABSTRACT

An eyewear-type mobile terminal includes a camera; an output unit configured to output road guide information; and a controller configured to: acquire information about a current position; cause the output unit to output the road guide information for a route from the current position to a destination; cause the camera to acquire visual information in real-time while the road guide information is output; and update the road guide information in real-time based on the acquired visual information.

12 Claims, 16 Drawing Sheets

(51) Int. Cl.
*G06T 7/60* (2017.01)
*G06K 9/00* (2006.01)

(52) U.S. Cl.
CPC .......... *G06K 9/00671* (2013.01); *G06T 7/60* (2013.01); *G06T 19/006* (2013.01); *G02B 2027/0178* (2013.01)

(56) References Cited

U.S. PATENT DOCUMENTS

| | | | | |
|---|---|---|---|---|
| 2006/0055525 | A1* | 3/2006 | Kubota | G08G 1/0962 340/461 |
| 2007/0156336 | A1 | 7/2007 | Chang et al. | |
| 2008/0167937 | A1 | 7/2008 | Coughlin et al. | |
| 2009/0083627 | A1* | 3/2009 | Onda | G06F 3/04815 715/708 |
| 2010/0098297 | A1* | 4/2010 | Zhang | B60W 30/09 382/104 |
| 2010/0253494 | A1* | 10/2010 | Inoue | G01C 21/36 340/436 |
| 2010/0253540 | A1* | 10/2010 | Seder | B60R 1/00 340/905 |
| 2010/0274478 | A1* | 10/2010 | Takahashi | G01C 21/30 701/533 |
| 2011/0087433 | A1* | 4/2011 | Yester | G08G 1/163 701/301 |
| 2011/0238290 | A1 | 9/2011 | Feng et al. | |
| 2011/0242311 | A1* | 10/2011 | Miyajima | G01C 21/3602 348/116 |
| 2011/0288766 | A1* | 11/2011 | Nagasawa | G01C 21/3632 701/533 |
| 2012/0050144 | A1 | 3/2012 | Morlock | |
| 2012/0218093 | A1* | 8/2012 | Yoshizawa | B60R 1/00 340/435 |
| 2012/0234805 | A1* | 9/2012 | Schwarz | B23K 26/03 219/121.63 |
| 2012/0314071 | A1* | 12/2012 | Rosenbaum | B60W 30/0956 348/148 |
| 2013/0096828 | A1 | 4/2013 | Fujimoto et al. | |
| 2014/0052370 | A1 | 2/2014 | Watanabe et al. | |
| 2014/0204267 | A1* | 7/2014 | Akiba | H04N 5/2353 348/362 |
| 2014/0362195 | A1* | 12/2014 | Ng-Thow-Hing | G06K 9/00791 348/51 |
| 2015/0063661 | A1* | 3/2015 | Lee | G06F 3/011 382/124 |
| 2016/0033770 | A1* | 2/2016 | Fujimaki | G06T 19/006 345/8 |
| 2016/0123742 | A1* | 5/2016 | Tawara | G06T 11/00 348/116 |
| 2016/0123758 | A1* | 5/2016 | Benzaia | H04N 7/185 701/538 |
| 2016/0154240 | A1* | 6/2016 | Lee | G02B 27/0093 345/8 |

FOREIGN PATENT DOCUMENTS

| | | |
|---|---|---|
| DE | 10-2008-042397 | 4/2010 |
| DE | 102008042397 | 4/2010 |
| DE | 102012013503 | 1/2014 |
| DE | 102012017114 | 3/2014 |
| EP | 1806562 | 7/2007 |
| EP | 1933277 | 6/2008 |
| EP | 1944578 | 7/2008 |
| EP | 2889581 | 7/2015 |
| JP | 2004-333467 | 11/2004 |
| WO | 10/045976 | 4/2010 |
| WO | 13/088223 | 6/2013 |
| WO | 14/044173 | 3/2014 |
| WO | 2014/044173 | 3/2014 |
| WO | 14/201324 | 12/2014 |
| WO | 2014/201324 | 12/2014 |
| WO | WO/2014/203592 | * 12/2014 |

OTHER PUBLICATIONS

Kim, et al., "Vision-Based Location Positioning Using Augmented Reality For Indoor Navigation," IEEE Transactions on Consumer Electronics, vol. 54, No. 3, XP011235533, Aug. 2008, 9 pages.
European Patent Office Application Serial No. 151506433, Search Report dated Feb. 22, 2016, 18 pages.

* cited by examiner

EYEWEAR-TYPE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2014-0079136, filed on Jun. 26, 2014, the contents of which are incorporated by reference herein in its entirety.

BACKGROUND OF THE INVENTION

1. Field of the Invention

The present invention relates to a terminal configured to be wearable on a user's head.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

A recent mobile terminal is configured as a wearable device that is wearable on a human body, beyond the conventional technique of a user grasping the mobile terminal using his or her hand. An example of such wearable device is an eyewear-type terminal. The eyewear-type terminal may be an eyeglasses-type or a contact lens-type, and the eyeglasses-type terminal may include a frame. Further, the eyewear-type terminal may be provided with a camera and various images may be captured through the camera.

SUMMARY OF THE INVENTION

To achieve objects of the present invention, there is provided an eyewear-type terminal including an output unit configured to output road guide information corresponding to a route from the current position to a destination; and a control unit configured to acquire visual information through a camera while the road guide information is output, and guide a direction toward the destination based on the visual information.

In an embodiment, the control unit may be configured to recognize an object included in the visual information and guide the direction toward the destination based on the recognized object.

In an embodiment, the control unit may be configured to recognize an object having a feature point which has been preset among plural objects included in the visual information and guide the direction toward the destination based on the recognized object.

In an embodiment, the object having the preset feature point may include one of an object having a highest chroma, an object having a largest area or size, an object having a largest-sized text, or an object located at a nearest distance from the current position among the plural objects, or a combination thereof.

In an embodiment, the control unit may be configured to detect a feature point of the recognized object, and reflect the detected feature point to the guide information.

In an embodiment, the recognized feature point of the object may be one of a color, a shape, a text of the recognized object, or a combination thereof.

In an embodiment, the control unit may be configured to, when user's non-recognition information on the direction toward the destination is detected while the road guide information is output, acquire the visual information based on the user's non-recognition information.

In an embodiment, the control unit may be configured to acquire the visual information when a user's head movement is equal to or similar to a preset movement pattern while the road guide information is output.

In an embodiment, the control unit may be configured to acquire the visual information when the eyewear-type terminal repeatedly moves a specific section among plural sections of the route more than the preset number within the preset time while the road guide information is output.

In an embodiment, the control unit may be configured to acquire the visual information when the moving speed of the eyewear-type terminal is equal to or similar to the preset speed pattern while the road guide information is output.

In an embodiment, the control unit may be configured to acquire the visual information when the moving direction of the eyewear-type terminal is changed by the preset number for the preset time while the road guide information is output.

In an embodiment, the control unit may be configured to acquire the visual information when the user's heart rate is out of a reference value while the road guide information is output.

In an embodiment, the control unit may be configured to, when a user's gesture that points to a specific direction and/or a passing spot is input while the road guide information is output, search the passing spot located at the specific direction and guide a route from the current position to the searched passing spot.

In an embodiment, the control unit may be configured to, when the current time corresponds to time to move, propose a road guide to a desired place on the moving time.

In an embodiment, the control unit may be configured to, when a user's biological signal is out of a reference value while the road guide information is output, propose a road guide to a new route which detours the route.

In an embodiment, the control unit may be configured to, when a peripheral brightness is less than a reference value while the road guide information is output, propose a road guide to a new route which detours the route.

In an embodiment, the control unit may be configured to, when the moving speed of the eyewear-type terminal is out of a reference value while the road guide information is output, propose a road guide to a new route which detours the route.

In an embodiment, the control unit may be configured to detect the number of persons within images captured through the camera while the road guide information is output, and when the detected number of persons is out of a reference value, propose a road guide to a new route which detours the route.

In an embodiment, the control unit may be configured to, when a direction change is repeated by a preset number for a preset time while the road guide information is output, propose a road guide to a new route which detours the route.

In an embodiment, the control unit may be configured to, when the current position becomes closer to a preset habitual route-deviation spot while the road guide information is output, output a highlight effect to the preset habitual route-deviation spot.

DETAILED DESCRIPTION OF THE PREFERRED EMBODIMENT

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
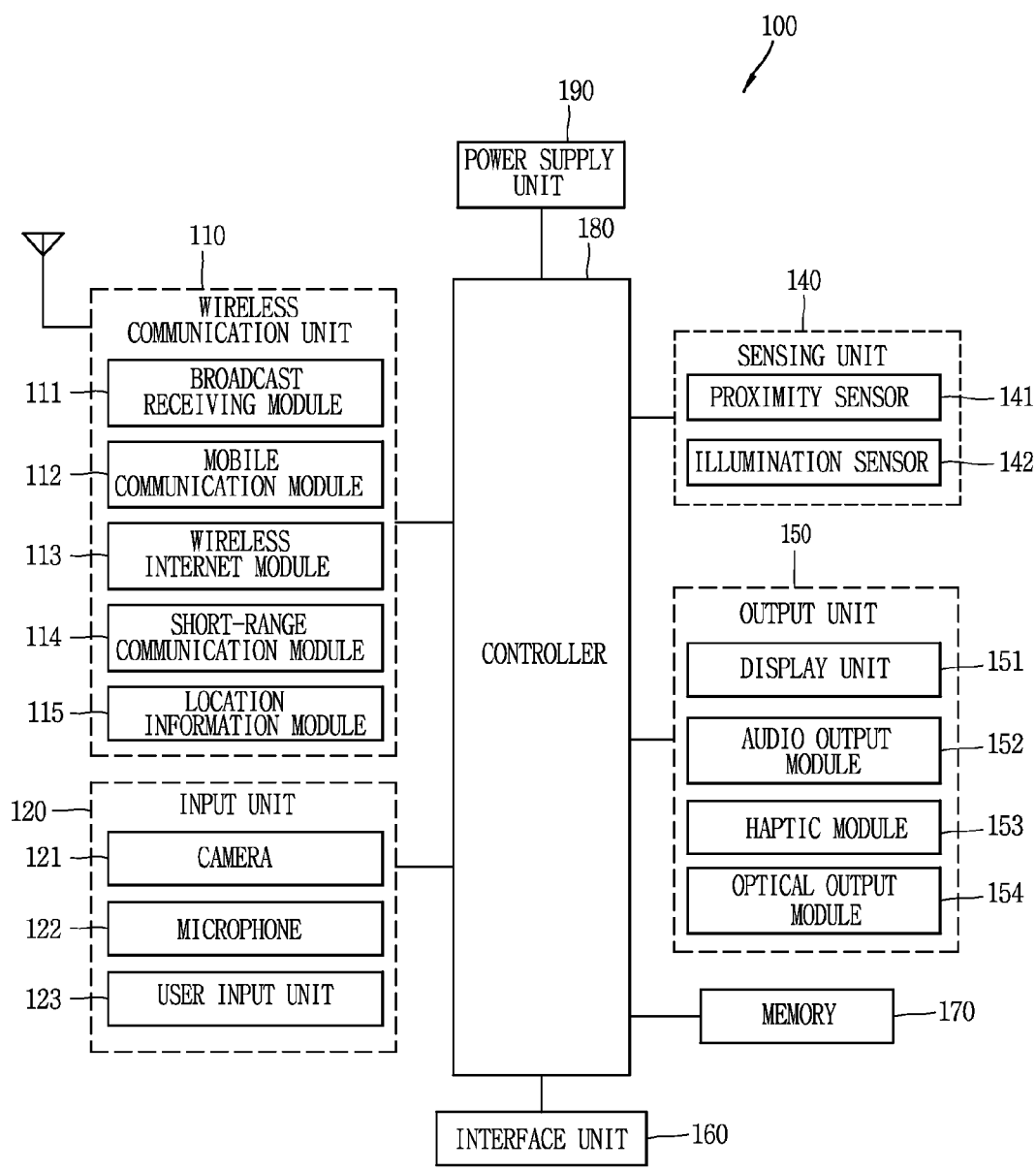
FIG. 1 is a block diagram illustrating an eyewear-type terminal according to an embodiment of the present invention.

FIG. 1 is a block diagram illustrating the configuration of an eyewear-type mobile terminal 100 according to an embodiment of the present invention.

Referring to FIG. 1, the eyewear-type mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the wireless communication unit 110 typically includes one or more modules which permit communications such as wireless communications between the eyewear-type mobile terminal 100 and a wireless communication system, communications between the eyewear-type mobile terminal 100 and another mobile terminal, communications between the eyewear-type mobile terminal 100 and an external server. Further, the wireless communication unit 110 typically includes one or more modules which connect the eyewear-type mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), a chemical sensor (for example, an electronic nose, a health care sensor, a biometric sensor, and the like), a heart rate detecting sensor, a sensor for sensing brain waves. The eyewear-type mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the eyewear-type mobile terminal 100 and a user, as well as function as the user input unit 123 which provides an input interface between the eyewear-type mobile terminal 100 and the user.

The interface unit 160 serves as an interface with various types of external devices that can be coupled to the eyewear-type mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the eyewear-type mobile terminal 100 may perform assorted control functions associated with a connected external device, in response to the external device being connected to the interface unit 160.

The memory 170 is typically implemented to store data to support various functions or features of the eyewear-type mobile terminal 100. For instance, the memory 170 may be configured to store application programs executed in the eyewear-type mobile terminal 100, data or instructions for operations of the eyewear-type mobile terminal 100, and the like. Some of these application programs may be downloaded from an external server via wireless communication. Other application programs may be installed within the eyewear-type mobile terminal 100 at time of manufacturing or shipping, which is typically the case for basic functions of the eyewear-type mobile terminal 100 (for example, receiving a call, placing a call, receiving a message, sending a message, and the like). It is common for application programs to be stored in the memory 170, installed in the eyewear-type mobile terminal 100, and executed by the controller 180 to perform an operation (or function) for the eyewear-type mobile terminal 100.

The controller 180 typically functions to control overall operation of the eyewear-type mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170.

As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the eyewear-type mobile terminal 100. The power supply unit 190 may include a battery, and the battery may be configured to be embedded in the terminal body, or configured to be detachable from the terminal body.

At least part of the above components may cooperate with each other, so as to control an operation of an eyewear-type mobile terminal according to various embodiments to be explained later. A method of controlling an eyewear-type mobile terminal may be implemented on the mobile terminal, by driving at least one application program stored in the memory 170.

Figure 2:
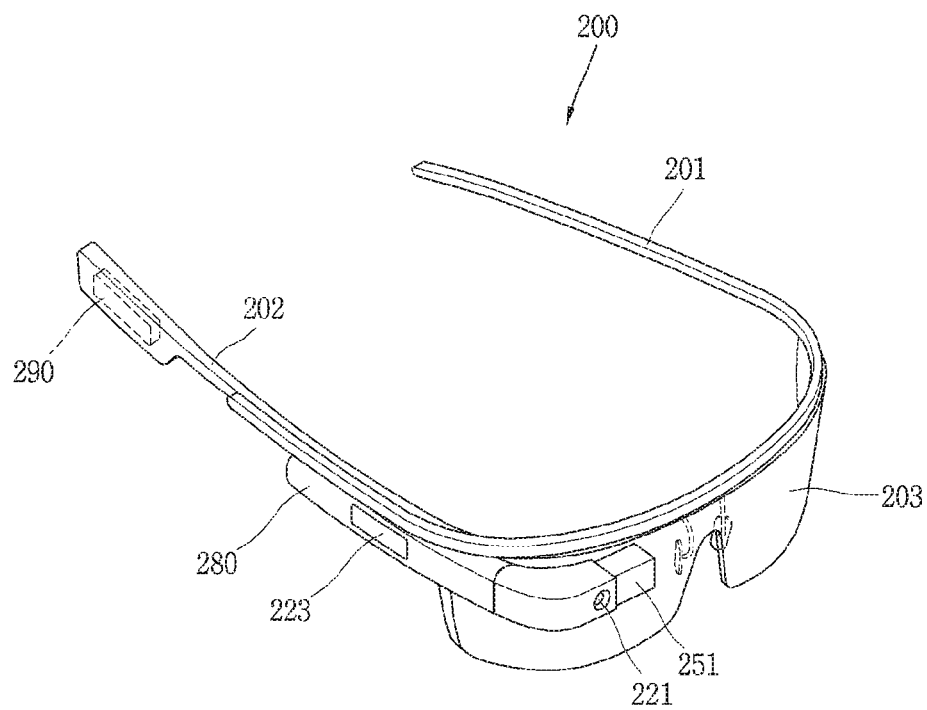
FIG. 2 is a view schematically illustrating an eyewear-type terminal according to an embodiment of the present invention.

FIG. 2 is a perspective view illustrating one example of an eyewear-type mobile terminal 200 according to an exemplary embodiment.

The mobile terminal 200 can be wearable on a head of a human body and provided with a frame 201 (case, housing, etc.) therefor. The frame may be made of a flexible material to be easily worn. The frame of the eyewear-type mobile terminal 200 is shown having a first frame 201 and a second frame 202, which can be made of the same or different materials.

The frame 201 may be supported on the head and defines a space for mounting various components. As illustrated, electronic components, such as a controller 280, a power supply unit 290 and an audio output module (not shown), may be mounted to the frame 201. Also, a lens 203 for covering either or both of the left and right eyes may be detachably coupled to the frame.

The controller 280 controls various electronic components disposed in the eyewear-type mobile terminal 200. The control module 280 may be understood as a component corresponding to the aforementioned controller 180. FIG. 2 illustrates that the controller 280 is installed in the frame part on one side of the head, but other locations are possible.

The display unit 251 may be implemented as a head mounted display (HMD). The HMD refers to display techniques by which a display is mounted to a head to show an image directly in front of a user's eyes. In order to provide an image directly in front of the user's eyes when the user wears the eyewear-type mobile terminal 200, the display unit 251 may be located to correspond to either or both of the left and right eyes. FIG. 2 illustrates that the display unit 251 is located on a portion corresponding to the right eye to output an image viewable by the user's right eye.

The display unit 251 may project an image into the user's eye using a prism. Also, the prism may be formed from optically transparent material such that the user can view both the projected image and a general visual field (a range that the user views through the eyes) in front of the user.

In such a manner, the image output through the display unit 251 may be viewed while overlapping with the general visual field. The eyewear-type mobile terminal 200 may provide an augmented reality (AR) by overlaying a virtual image on a realistic image or background using the display.

The camera 221 may be located adjacent to either or both of the left and right eyes to capture an image. Since the camera 221 is located adjacent to the eye, the camera 221 can acquire a scene that the user is currently viewing.

The eyewear-type terminal 200 may be configured to further include a camera (not shown) disposed close to one of left and right eyes to detect a user's eyeline (the left or right eye) and a user's facial expression.

In the drawings, the camera 221 is provided at the controller 280. However, the present invention is not limited to this. The camera 221 may be positioned at the frame, or multiple cameras may be utilized. Such multiple cameras may be used to acquire a stereoscopic image.

The eyewear-type mobile terminal 200 may include the user input unit 223, which can each be manipulated by the user to provide an input. The user input unit 223 may employ techniques which permit input via a tactile input. Typical tactile inputs include a touch, push, or the like. The user input unit 223 is shown operable in a touching manner as it is located on the frame.

If desired, eyewear-type mobile terminal 200 may include a microphone which processes input sound into electric audio data.

The eyewear-type mobile terminal 200 may include an audio output module for outputting audio. The audio output module may be configured to produce audio in a general audio output manner or an osteoconductive manner. When the audio output module is implemented in the osteoconductive manner, the audio output module may be closely adhered to the head when the user wears the eyewear-type mobile terminal 200 and vibrate the user's skull to transfer sounds. In this case, the audio output module may be provided at the same insertion part as that of the microphone.

Hereinafter, an eyewear-type terminal and a method for controlling the same will be described. The method includes acquiring visual information through a camera 121 while road guide information corresponding to a route from the current position to the destination is output, and guiding a direction toward the destination based on the visual information, so that a user may promptly and conveniently confirm (recognize) the direction of the destination based on the visual information when the user lost his way.

Figure 3:
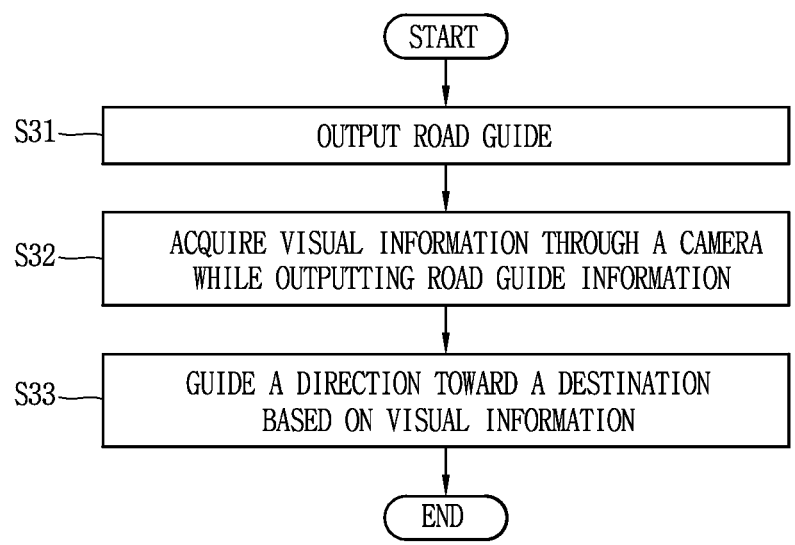
FIG. 3 is a flowchart illustrating a control method according to an embodiment of the present invention.

FIG. 3 is a flowchart illustrating a control method according to an embodiment of the present invention.

First, a control unit 180 is configured to generate road guide information corresponding to a route from the current position to the destination according to a user's request, and output the generated road guide information through an output unit (S31). For instance, the control unit 180 is configured to generate road guide information (for instance, turn-by-turn information, a remaining distance from the current position to the destination, interest spot information on a route and the like) guiding a route from the current position, which is detected real time by a position information module 115 to the destination, which has been input by a user, and output the generated road guide information through the display unit 151 and/or an audio output unit 152. The route from the current position to the destination may include an on foot route, a car running route, or a bike running route.

The control unit 180 is configured to, when user's non-recognition information, indicating that a user does not recognize the direction toward the destination, is detected while road guide information is output, acquire visual information corresponding to a user's eyeline direction through the camera 121 based on the user's non-recognition information (S32).

The control unit 180 is configured to detect a difference between the direction of the acquired visual information and the direction toward the destination, generate guide information informing the direction toward the destination based on the generated guide information, and output the generated guide information through the display unit 151 and/or the audio output unit 152 (S33). For instance, the control unit 180 is configured to recognize a specific object included in the visual information, and guide a direction toward the destination based on a difference between a direction of the recognized object and a direction toward the destination.

The control unit 180 may be configured to recognize an object having a preset feature point among plural objects included in the visual information, and guide a direction toward the destination based on the recognized object (a position and direction of the object). The object having the preset feature point may include an object having a highest chroma, an object having a largest area or size, an object having a largest-sized text, or an object located at a nearest distance from the current position among the plural objects.

The control unit 180 may be configured to detect visual information (for instance, a color, a text, a shape (structure) of the recognized object and the like) on the recognized object, and display the detected visual information on the display unit 151 or output through the audio output 152 as a voice.

The control unit 180 may be configured to, when a user's head movement is equal to or similar to a preset head movement pattern in a state where a movement of the eyewear-type terminal 200 is stopped (a user's movement is stopped) while the road guide information is output, recognize that the user's non-recognition information is detected, and acquire visual information through the camera 121 based on the user's non-recognition information. For instance, the control unit 180 is configured to, when a head movement, which is equal to or similar to a head movement (a preset movement pattern) implemented when a user looks around in a motionless state, is detected, recognize that the user's non-recognition information is detected, and acquire visual information through the camera 121 based on the user's non-recognition information.

The control unit 180 may be configured to, when the eyewear-type terminal 200 is repeatedly moved more than a preset number of times (for instance, two times) at a specific section among plural sections of the route while the road guide information is output, recognize that the user's non-recognition information is detected, and acquire visual information through the camera 121 based on the user's non-recognition information. For instance, the control unit 180 is configured to, when a user wearing the eyewear-type terminal repeatedly moves at the specific section, recognize that the user's non-recognition information is detected, and acquire the visual information through the camera 121 based on the user's non-recognition information.

The control unit 180 may be configured to, when the eyewear-type terminal 200 is repeatedly moved more than a preset number of times (for instance, two times) within a preset time (for instance, 20-30 seconds) at a specific section among plural sections of the route while the road guide information is output, recognize that the user's non-recognition information is detected, and acquire the visual information through the camera 121 based on the user's non-recognition information. For instance, the control unit 180 is configured to, when a user wearing the eyewear-type terminal repeatedly moves at the specific section within a preset time (for instance, 20-30 seconds), recognize that the user's non-recognition information is detected, and acquire the visual information through the camera 121 based on the user's non-recognition information. The preset time (for instance, 20-30 seconds) and the preset number of times (for instance, two times) may be changed according to a user or designer's intention.

The control unit 180 may be configured to, when a movement speed pattern (a user's movement pattern) of the eyewear-type terminal 200 is equal to or similar to a preset speed pattern while the road guide information is output, recognize that the user's non-recognition information is detected, and acquire the visual information through the camera 121 based on the user's non-recognition information.

The control unit 180 may be configured to, when a moving direction (a user's moving direction) of the eyewear-type terminal 200 is irregularly changed for a preset time (20-30 seconds) while the road guide information is output, recognize that the user's non-recognition information is detected, and acquire visual information through the camera 121 based on the user's non-recognition information. For instance, the control unit 180 may be configured to, when a moving direction (a user's moving direction) of the eyewear-type terminal 200 is irregularly changed due to a user's hanging about, recognize that the user's non-recognition information is detected, and acquire visual information through the camera 121 based on the user's non-recognition information.

The control unit 180 may be configured to, when a moving direction (a user's moving direction) of the eyewear-type terminal 200 is changed by a preset number of times for a preset time (for instance, 20-30 seconds) while the road guide information is output, recognize that the user's non-recognition information is detected, and acquire visual information through the camera 121 based on the user's non-recognition information.

The control unit 180 may be configured to, when a user's heart rate is out of a reference value while the road guide information is output, recognize that the user's non-recognition information is detected, and acquire visual information through the camera 121 based on the user's non-recognition information. For instance, the control unit 180 may be configured to detect a user's heart rate through a sensor for sensing a heart rate while the road guide information is output, recognize that the user's non-recognition information is detected when the detected heart rate is out of the preset reference value (for instance, 120 mm Hg/80 mm Hg), and acquire visual information through the camera 121 based on the user's non-recognition information. The preset reference value (for instance, 120 mm Hg/80 mm Hg) may be changed according to a user or designer's intention.

Figure 4A:
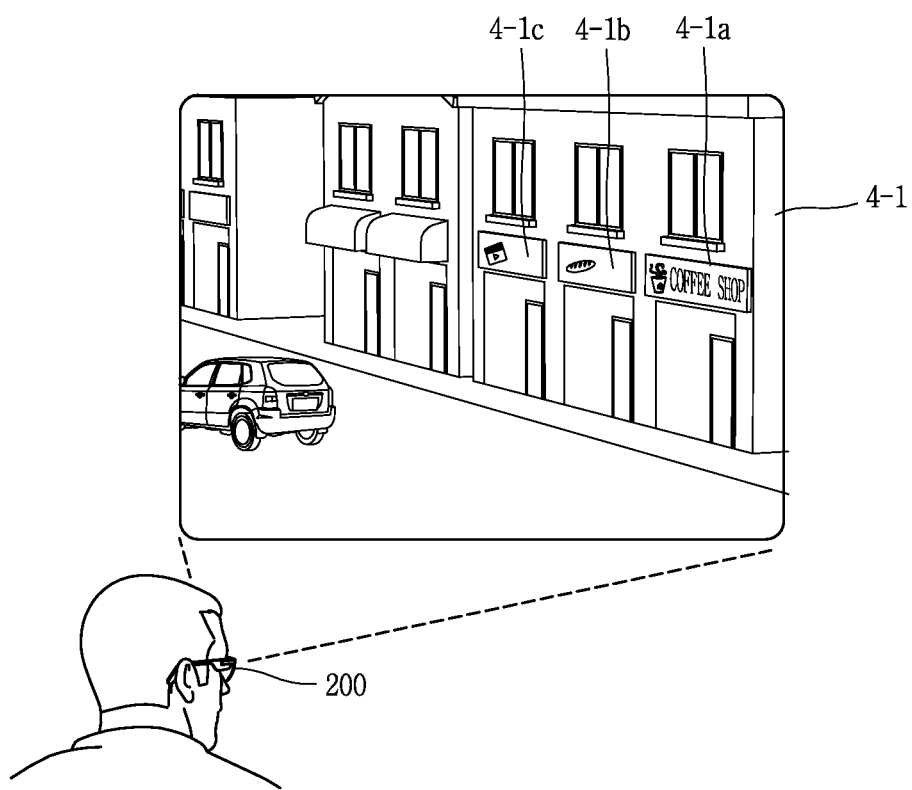
FIGS. 4A and 4B are exemplary views illustrating a method to guide a road based on an object within visual information.
Figure 4B:
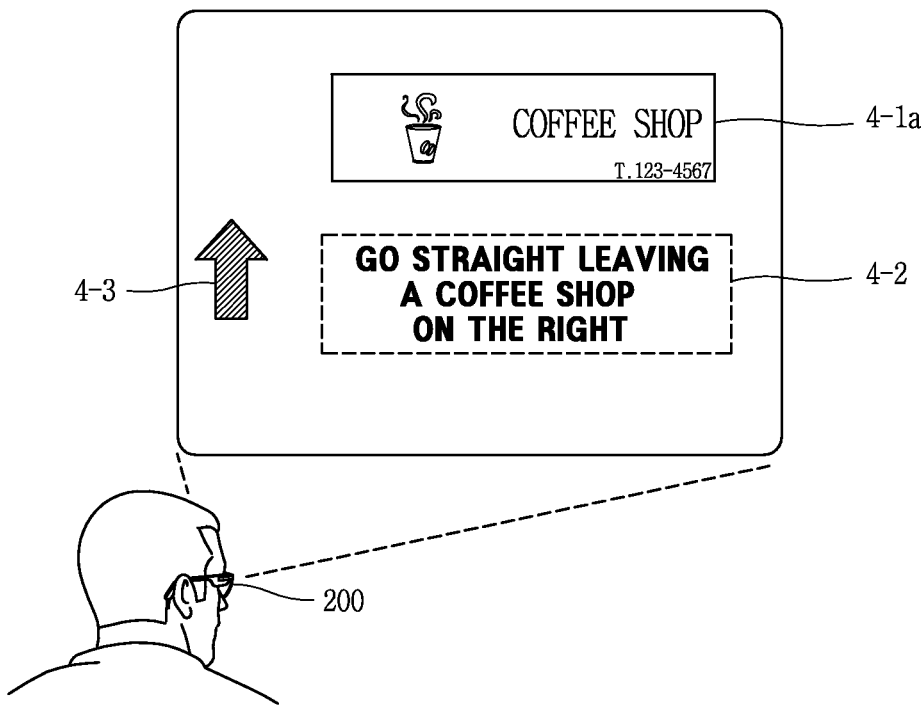

FIGS. 4A and 4B are exemplary views illustrating a method to guide a road based on an object within visual information.

As shown in FIG. 4A, the control unit 180 may be configured to, when user's non-recognition information is detected while the road guide information is output, acquire visual information (4-1) corresponding to a user's eyeline direction through the camera 121, recognize an object (4-1a) having a preset feature point within the acquired visual information (4-1), and generate guide information (for instance, Go straight with leaving the object on the right) informing the direction toward the destination based on the acquired object (4-1a) (based on the position and direction of the object (4-1a).

As shown in FIG. 4B, the control unit 180 is configured to display the generated guide information (4-2) at a position adjacent to the object (4-1a). The guide information (4-2) may further include turn-by-turn information (4-3). For instance, the control unit 180 is configured to recognize an object (4-1a) having a preset feature point among the plural objects (4-1a, 4-1b and 4-1c) within the acquired visual information (4-1), and provide, based on the recognized object (4-1a), guide information informing a direction toward the destination to the user. The control unit 180 may be configured to output the guide information (4-2 and 4-3)through the audio output unit 152 as a voice. The objects may include a building, a signboard (for instance, a coffee shop with a green signboard), a structure (a blue arch-shaped overpass), a car (for instance, a white medium-sized vehicle with a car number 34 Gu 1234) and the like.

The control unit 180 may be configured to recognize feature points, such as a chroma, an area (or a size), a text, and a distance of the plural objects (4-1a, 4-1b and 4-1c) within the acquired visual information, and recognize the object (4-1a) having a preset feature point based on one or a combination of more than two of the above feature points. For instance, the control unit 180 may be configured to recognize, as an object (4-1a) having the preset feature point, the object having one or more than two feature points among the feature points, i.e., a maximum chroma, a maximum area (or a maximum size), a largest-sized text, and a minimum distance (a minimum distance from the current position) among the plural objects (4-1a, 4-1b and 4-1c) within the acquired visual information.

The control unit 180 may be configured to output a highlight effect to the object having the preset feature point among the plural objects within the acquired visual information. For instance, the control unit 180 may be configured to indicate a border of the object having the preset feature point with a preset thick line, or indicate a border of the object having the preset feature point in a preset color, so as to highlight the object having the preset feature point. Further, the control unit 180 may be configured to have the remaining objects shaded, the remaining objects excluding the object having a preset feature point among the plural objects within the acquired visual information, so as to highlight the object having the preset feature point.

The control unit 180 may be configured to indicate an indicator such as a finger or a pointer at the periphery of the object having a preset feature point. The control unit 180 may be configured to control the indicator to follow the object having the feature point according to a user's eyeline movement.

The control unit 180 may be configured to recognize, as a signboard, a first object having a shape of a signboard among the objects within the acquired visual information. Further, the control unit 180 may be configured to recognize the first object as a signboard, when the first object having a shape of a signboard among the objects within the acquired visual information includes a text and/or telephone number or the like.

Figure 5:
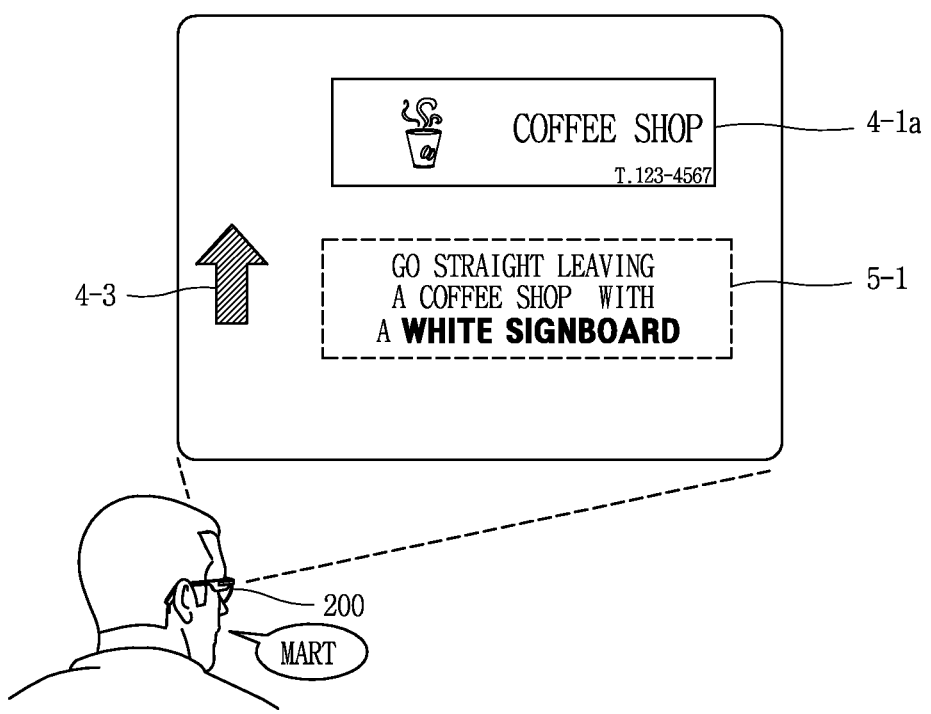
FIG. 5 is an exemplary view illustrating another method to guide a road based on an object within visual information.

FIG. 5 is an exemplary view illustrating another method to guide a road based on an object within visual information.

As shown in FIG. 5, the control unit 180 is configured to, when the user's non-recognition information is detected while the road guide information is output, acquire visual information (4-1) corresponding to a user's eyeline direction through the camera 121, detect, among the plural objects (4-1a, 4-1b and 4-1c) within the acquired visual information (4-1), the object (4-1a) having the preset feature point (for instance, an object (4-1a) having a maximum area (or a maximum size), and detect a feature point of the object (4-1a). For example, the feature point of the object (4-1a) may be the color (for instance, white) of the object (4-1a), the shape (for instance, a shape of signboard, a shape of building and the like) of the object (4-1a), and a text (for instance, a coffee shop, a mart and the like) within the object (4-1a).

The control unit 180 may be configured to, when guide information informing the direction toward the destination is output based on the recognized object (4-1*a*), generate final guide information (for instance, Go straight with leaving a coffee shop with a white signboard on the right) (5-1) by reflecting the detected feature points, and display the guide information (5-1) at a position close to the object (4-1*a*). The control unit 180 may be configured to output the guide information (5-1 and 4-3) through the audio output unit 152 as a voice.

The control unit 180 may be configured to output a highlight effect to the recognized object (4-1*a*). For instance, the control unit 180 may be configured to indicate a border of the recognized object (4-1*a*) with a preset thick line, or indicate a border of the object (4-1*a*) in a preset color, so as to highlight the object (4-1*a*). Further, the control unit 180 may be configured to have the remaining objects (4-1*b* and 4-1*c*) shaded, the remaining object excluding the object (4-1*a*) among the plural objects within the acquired visual information, so as to highlight the acquired object (4-1). The control unit 180 may be configured to indicate an indicator such as a finger or a pointer at the periphery of the acquired object (4-1*a*). The control unit 180 may be configured to control the indicator to follow the acquired object.

Figure 6A:
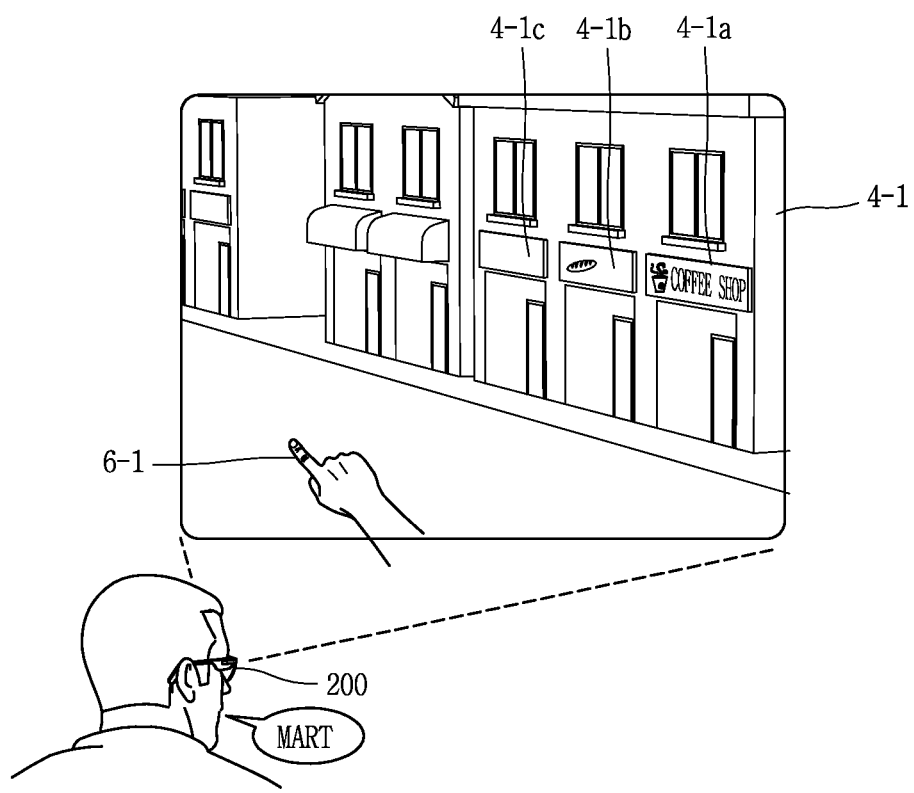
FIGS. 6A and 6B are exemplary views illustrating a method to select a passing spot while guiding a road based on an object within visual information.
Figure 6B:
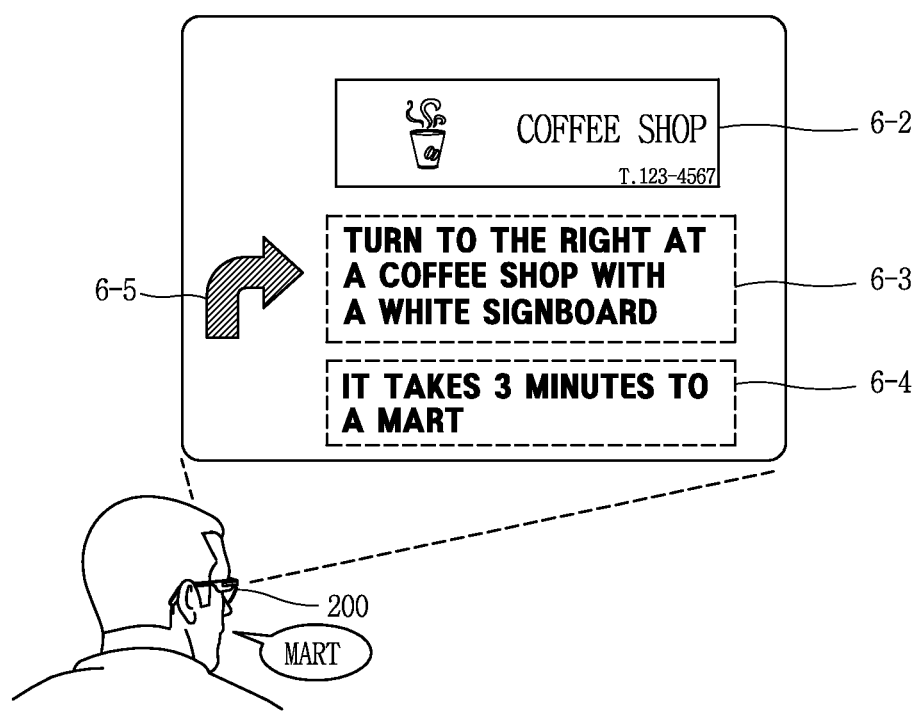

FIGS. 6A and 6B are exemplary views illustrating a method to select a passing spot while guiding a road based on an object within visual information.

As shown in FIG. 6A, the control unit 180 is configured to, when a user's input (for instance, a user's hand gesture, a direction of head leaning, a direction of user's eyeline and the like) (6-1) and a passing spot (for instance, a mart) while the guide information is output based on the objects (4-1*a*) within the visual information (4-1) are input, search the passing spot which is located in the specific direction, and output through the output unit, the road guide information corresponding to a route from the current position to the searched passing spot.

As shown in FIG. 6B, the control unit 180 is configured to, when a user's voice, corresponding to the passing spot (for instance, a mart) as well as a user's gesture (for instance, a user's hand gesture) (6-1) indicative of a straight direction while the guide information is output based on the object (4-1*a*) within the visual information (4-1), is input, search a mart located in the straight direction, and output road guide information (6-2, 6-3, 6-4 and 6-5) corresponding to a route from the current position to the searched mart through the output unit. Here, the control unit 180 may be configured to, when the user's non-recognition information is detected while the passing spot is guided, acquire visual information corresponding to the direction of the user's eyeline through the camera 121, recognize the object having the preset feature point within the acquired visual information, generate guide information informing the direction toward the passing spot based on the recognized object, and display the guide information at a position close to the object.

Figure 7A:
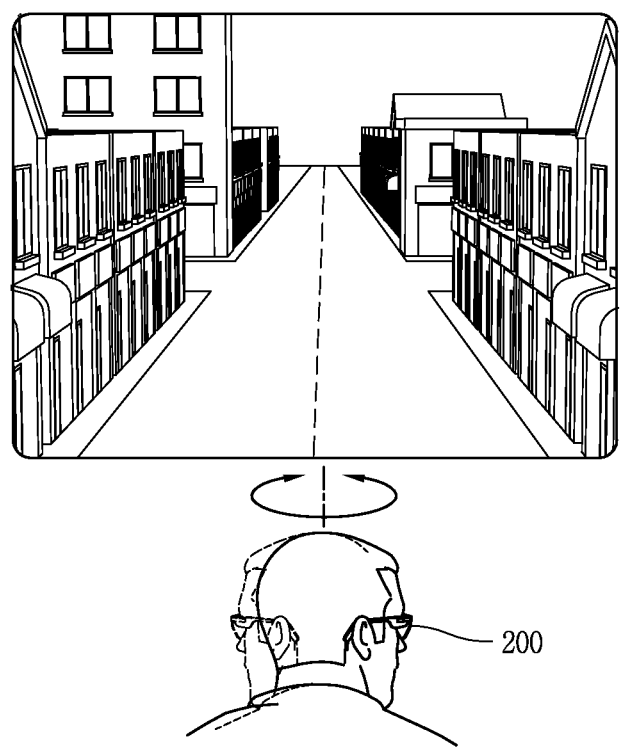
FIGS. 7A, 7B and 7C are exemplary views illustrating a method to propose a destination according to an embodiment of the present invention.
Figure 7B:
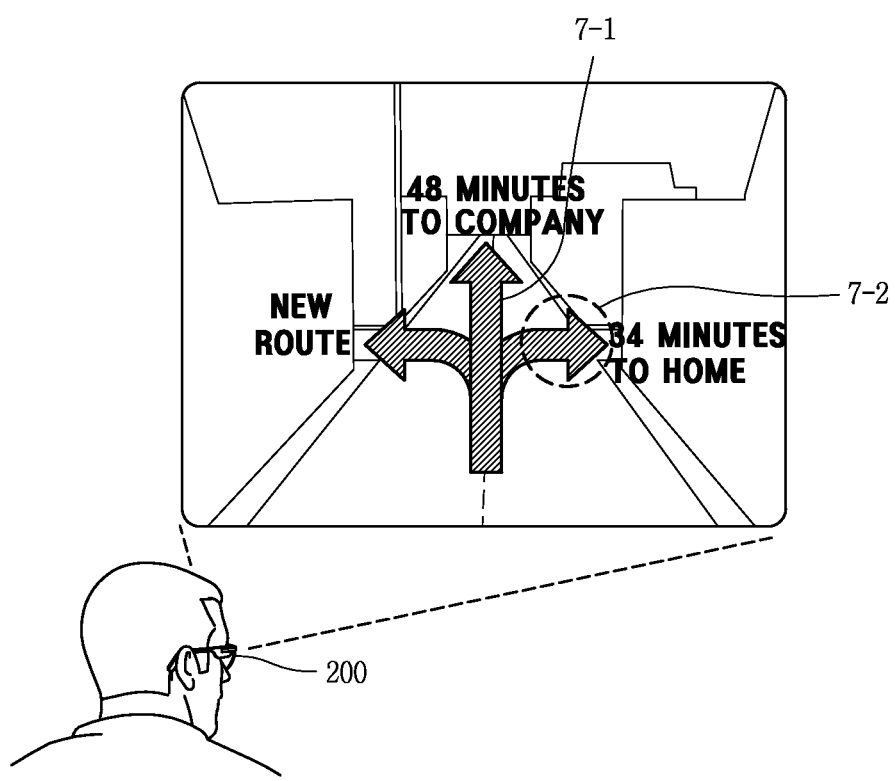
Figure 7C:
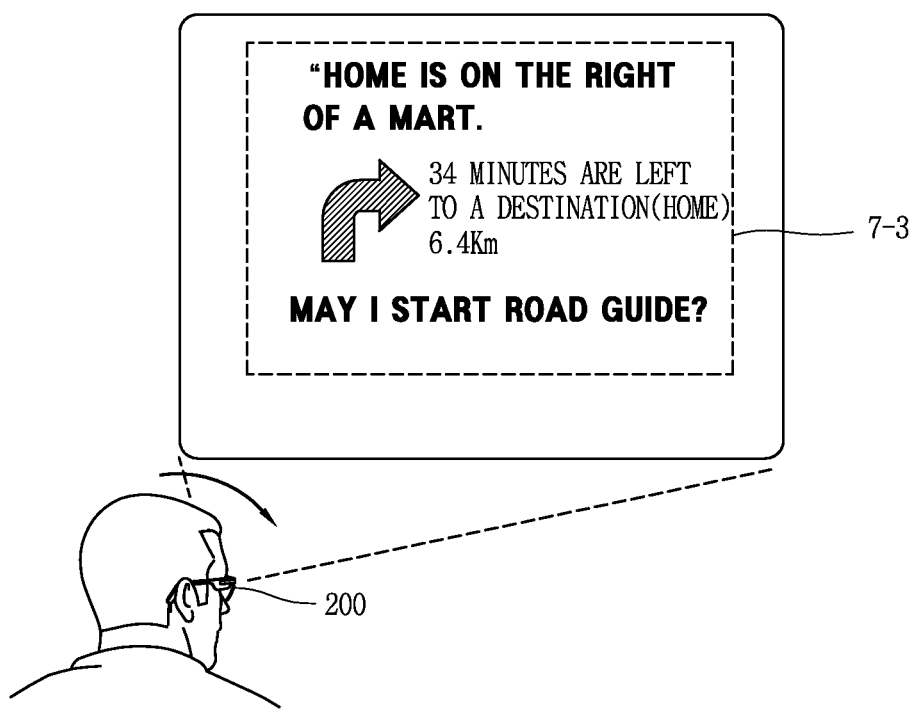

FIGS. 7A, 7B and 7C are exemplary views illustrating a method to propose a destination according to an embodiment of the present invention, in which the destination is proposed based on a history of previous destinations (information on previous destinations).

As shown in FIG. 7A, the control unit 180 is configured to, when the user's non-recognition information is detected in a state that a destination set by the user does not exist, read out from the memory 170, previous destinations (for instance, an office, home and the like) which may be movable from the current position. The control unit 180 may be configured to, when the user's non-recognition information is detected in a state where a destination set by the user does not exist, receive, from a server or a terminal (for instance, a mobile communication terminal such as a smart phone) via a wireless communications network, the previous destinations (for instance, office, home and the like) which may be movable from the current position. Further, the control unit 180 may be configured to search destination candidates from a dialog list, characters, a dialog with an agent, a schedule and the like which are stored in the terminal or the eyewear-type terminal, and recommend the detected candidates to the user.

As shown in FIG. 7B, the control unit 180 is configured to display route directions (7-1) from the current position to each of the previous destinations on the display unit 51. The control unit 180 may be configured to display not only the route directions (7-1), but also a required time and a required distance of each of the routes. The control unit 180 may be configured to, when previous destinations which are movable from the current position do not exist in the memory 170 or the server, display a new route which may be movable from the current position on the display unit 151.

The control unit 180 is configured to, when a user's input (for instance, a user's hand gesture, a head movement, a user's gazing, a touch input and the like) to select a first route direction (for instance, a direction to home) (7-2) among the route directions (7-1) is received, automatically set the previous destination corresponding to the first route direction as the current destination.

As shown in FIG. 7C, the control unit 180 is configured to, when the head is moved in the first route direction (7-2) among the route directions (7-1) or the user's gazes at the first route direction (7-2), set the previous destination (for instance, home) corresponding to the first route direction (7-2) as the current destination, and display an inquiry window (7-3) inquiring whether to guide a route from the current position to the currently set destination (for instance, home) on the display unit 151. The inquiry window (7-3) may include a required time and distance from the current position to the currently set destination and information on the direction toward the currently set destination (for instance, home is located on the right of the mart) and the like.

The control unit 180 may be configured to, when a user's input (for instance, a user's hand gesture, a head movement, a user's eyeline, a user's voice, a button operation of an eyewear-type terminal and the like) to request to guide a route from the current position to the currently set destination (for instance, home) is received in response to the inquiry window (7-2), generate road guide information corresponding to the route from the current position to the currently set destination (for instance, home), and output the road guide information through the output unit. Here, the control unit 180 may be configured to, when the user' non-recognition information is detected while the road guide information is output, acquire visual information corresponding to a user's eyeline direction through the camera 121, recognize an object having the preset feature point within the acquired visual information, generate guide information for guiding the direction toward the currently set destination based on the recognized object, and display the guide information at a position adjacent to the object.

Figure 8A:
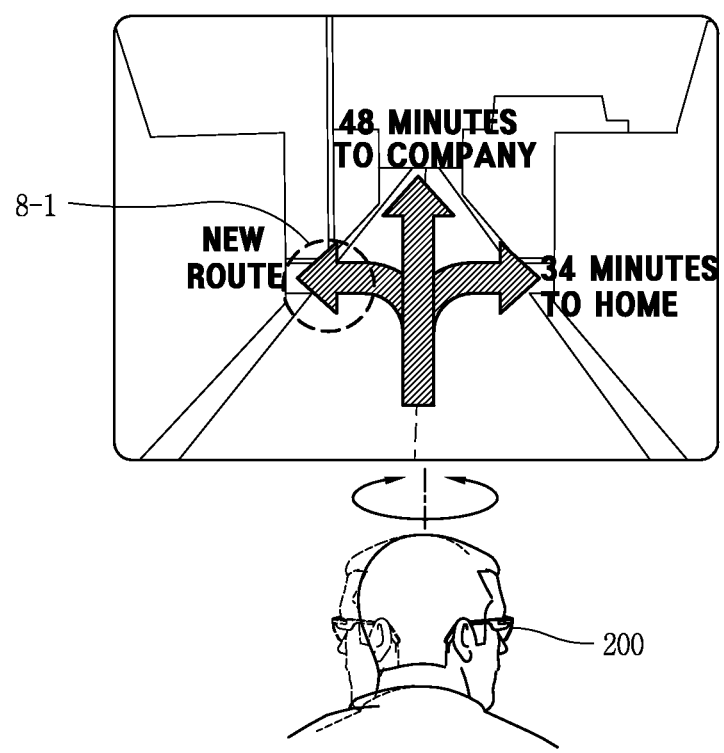
FIGS. 8A and 8B are exemplary views illustrating another method to propose a destination according to an embodiment of the present invention.
Figure 8B:
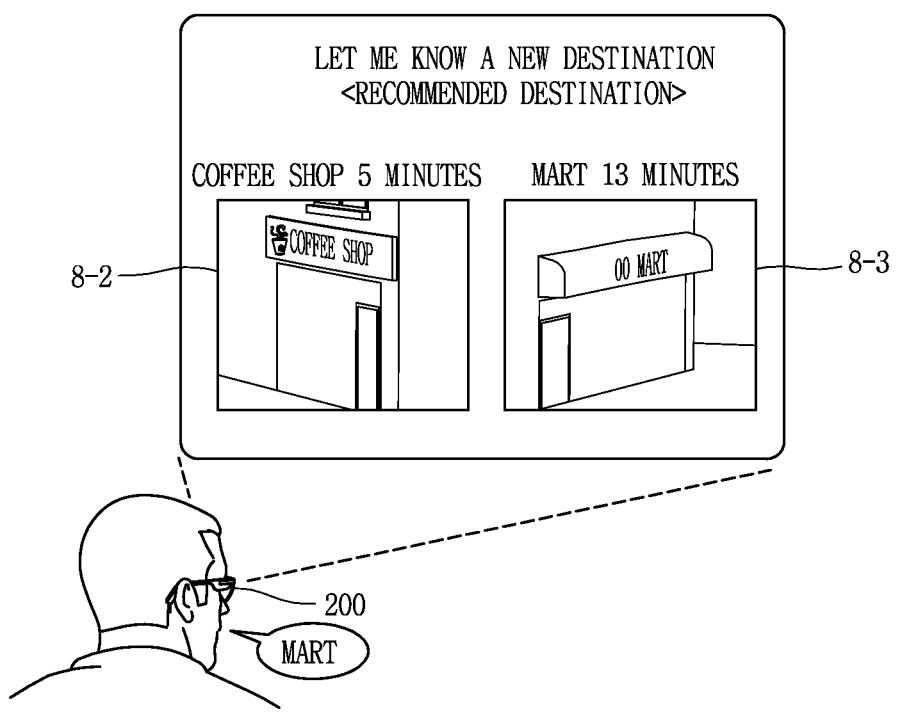

FIGS. 8A and 8B are exemplary views illustrating another method to propose a destination according to an embodiment of the present invention.

As shown in FIG. 8A, the control unit 180 is configured to, when user's non-recognition information is detected in a state where a destination set by a user does not exist, display a route direction of a previous destination that may be movable from the current position and a new route (8-1) that may be movable from the current position on the display unit 151. The control unit 180 is configured to, when a user's input (for instance, a user's hand gesture, a head movement, a user's eyeline, a user's voice, a button operation of an eyewear-type terminal and the like) for selecting a new route (8-1) that may be movable from the current position is received, display the recommended destination candidates on the display unit 151.

As shown in FIG. 8B, the control unit 180 is configured to, when a user's input (for instance, a user's hand gesture, a head movement, a user's eyeline, a user's voice, a button operation of an eyewear-type terminal and the like) for selecting a new route (8-1) that may be movable from the current position is received, display user's interest spots which exist on the new route (8-1) as recommended destinations (for instance, a coffee shop, a mart and the like) on the display unit 151.

The control unit 180 may be configured to, when displaying the recommended destinations existing in the new route (8-1) on the display unit 151, further display an image and a title of each of the recommended destinations, a required time and distance from the current position to each of the recommended destinations and the like on the display unit 151.

The control unit 180 is configured to, when a user's input for selecting a new route (8-1) that may be movable from the current position is received, list in an array the recommended destinations which exist on the new route (8-1) on the display unit 151 in order of shortest distance from the current position.

The control unit 180 is configured to, when a user's input (for instance, a user's hand gesture, a head movement, a user's eyeline, a touch input and the like) for selecting a specific recommended destination (8-3) among the recommended destinations (8-2 and 8-3), select the specific destination (8-3), and output the road guide information corresponding to the route from the current position to the selected specific recommended destination (8-3) through the output unit. For instance, the control unit 180 is configured to, when a user gazes at a specific recommended destination (8-3) among the recommended destinations, output the road guide information corresponding to the route from the current position to the selected recommended destination through the output unit. The control unit 180 may be configured to, when a user gazes at a specific recommended destination (8-3) among the recommended destinations, output a highlight effect to the specific recommended destination (8-3).

The control unit 180 may be configured to, when a user's voice (for instance, "mart") for selecting a specific recommended destination (for instance, "mart") (8-3) among the recommended destinations is input, output the road guide information corresponding to the route from the current position to the selected specific recommended destination through the output unit.

Figure 9A:
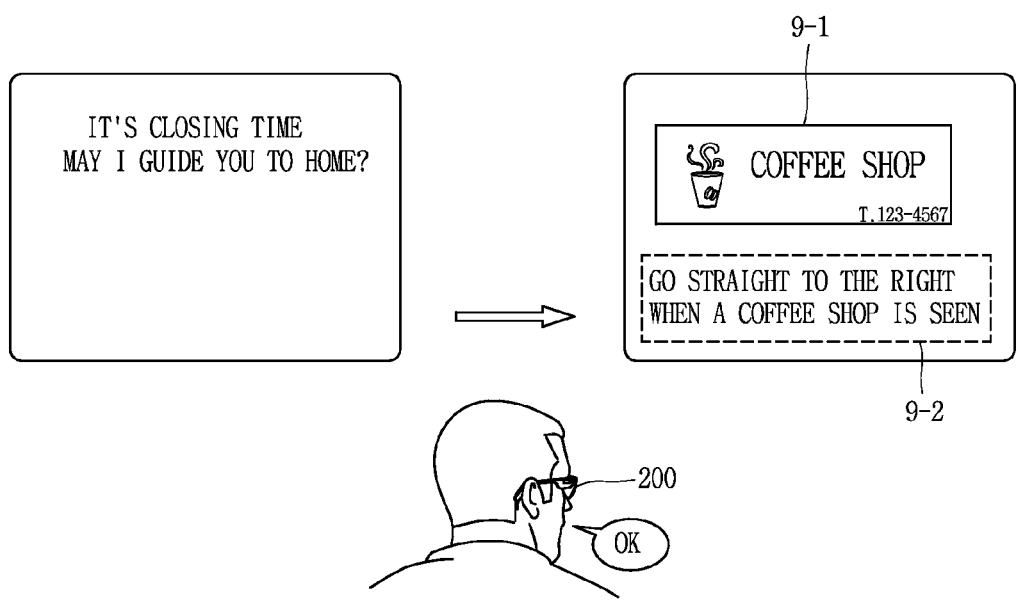
FIGS. 9A and 9B are exemplary views illustrating still another method to propose a destination according to an embodiment of the present invention.
Figure 9B:
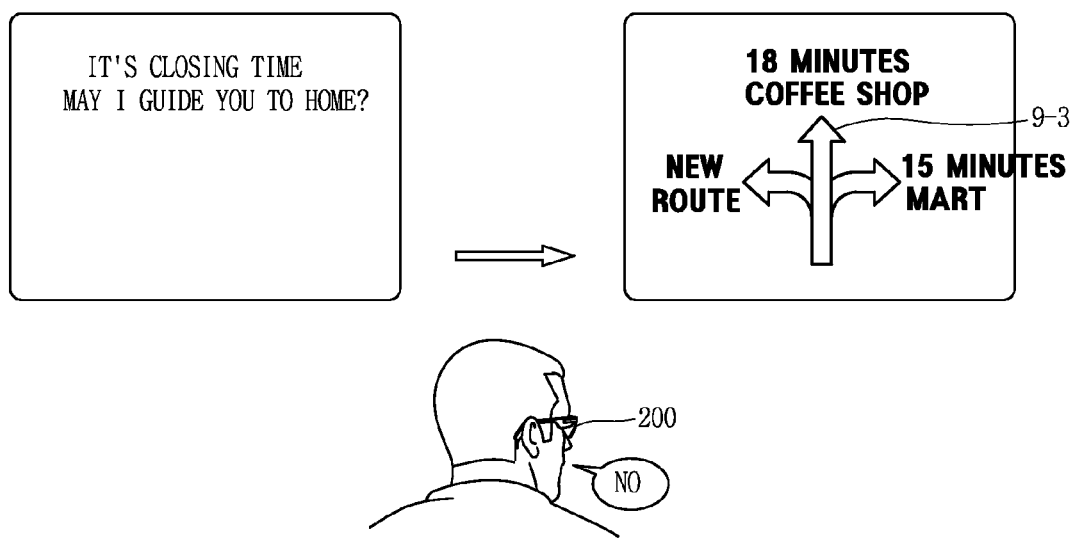

FIGS. 9A and 9B are exemplary views illustrating still another method to propose a destination according to an embodiment of the present invention.

As shown in FIG. 9A, the control unit 180 is configured to, when the current time corresponds to time to move (for instance, a closing time, a scheduled time and the like) in a state where a destination set by a user does not exist, display proposal information (for instance, It's a closing time. May I guide you to home?, and the like) to propose a road guide to a desired place (for instance, home, a scheduled position and the like) on the time to move on the display unit 151.

The control unit 180 may be configured to detect a user's movement pattern based on the user's personal information (for instance, lifecycle and the like) and use the place related to the moving pattern as proposal information for proposing the road guide.

Further, the server may be configured to detect a user's moving pattern based on the user's personal information (for instance, lifecycle and the like) which is input from the terminal or the eyewear-type terminal, or the user's personal information (for instance, lifecycle and the like) which is transmitted to the server, and use a place related to the user's moving pattern as the proposal information for proposing the road guide.

The control unit 180 may be configured to, when a user's input (for instance, a user's hand gesture, a head movement, a user's eyeline, a touch input and the like) to request a road guide is received in response to the proposal information, acquire visual information corresponding to the user's eyeline direction through the camera 121, recognize an object having the preset feature points within the acquired visual information, generate guide information (for instance, Go straight to the right when a coffee shop is seen) (9-1 and 9-2) for guiding the direction toward the place to move (for instance, home, a scheduled place and the like) based on the recognized object, and display the guide information at the position adjacent to the object.

As shown in FIG. 9B, the control unit 180 is configured to, when a user's input (for instance, a user's hand gesture, a user's head movement, a user's eyeline, a touch input and the like) to request a road guide is received, read out previous destinations (for instance, a coffee shop, a mart and the like) that may be movable from the current position from the memory 170, and display route directions (9-3) from the current position to each of the previous destinations on the display unit 151. The control unit 180 may be configured to display not only the route directions (9-3), but also a required time and distance of each of the routes on the display unit 151. The control unit 180 may be configured to display a new route that may be movable from the current position on the display unit 151 when the previous destinations that may be movable from the current position do not exist.

Figure 10:
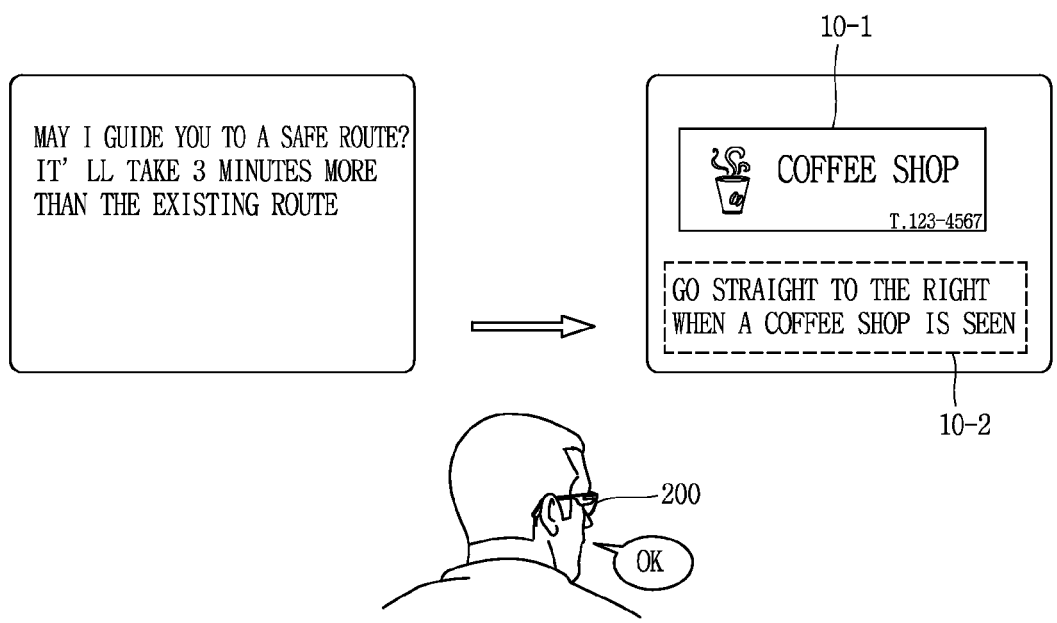
FIG. 10 is an exemplary view illustrating a method to guide a detour route while proposing a destination according to an embodiment of the present invention.

FIG. 10 is an exemplary view illustrating a method to guide a detour route while proposing a destination according to an embodiment of the present invention.

As shown in FIG. 10, the control unit 180 is configured to, when user's biological information is out of a reference value while road guide information is output, display proposal information (for instance, May I guide to a safe route? or the like) proposing a new route which detours the route corresponding to the road guide information on the display unit 151. For instance, the control unit 180 is configured to detect a user's heart rate through a sensor for sensing a heart rate while the road guide information is output, and display on the display unit 151 the proposal information proposing a road guide to a new route which detours the route corresponding to the road guide information when the detected heart rate is out of a reference value (for instance, 20 mm Hg/80 mm Hg).

The control unit 180 is configured to, when a user's input (for instance, a user's hand gesture, a head movement, a user's eyeline, a touch input and the like) requesting a road guide is input in response to the proposal information, acquire visual information corresponding to a user's eyeline direction through the camera 121, recognize an object having the preset feature point within the acquired visual information, generate guide information (for instance, Go straight to the right when a coffee shop is seen) (10-1 and 10-2) informing a direction toward the new route based on the recognized object, and display the guide information at a position adjacent to the object.

The control unit 180 may be configured to propose a road guide to a new route which detours the route corresponding to the road guide information when a peripheral brightness is less than a reference value while the road guide information is output. For instance, the control unit 180 is configured to detect a peripheral illumination (peripheral brightness) through an illumination sensor while the road guide information is output, and propose a road guide to a new route which detours the route corresponding to the road guide information when the detected illumination is less than the reference value (for instance, 10 Zone Name: A1,AMD As shown in FIG. 4B, the control unit 180 is configured to display the generated guide information (4-2) at a position adjacent to the object (4-1a). The guide information (4-2) may further include turn-by-turn information (4-3). For instance, the control unit 180 is configured to recognize an object (4-1a) having a preset feature point among the plural objects (4-1a, 4-1b and 4-1c) within the acquired visual information (4-1), and provide, based on the recognized object (4-1a), guide information informing a direction toward the destination to the user. The control unit 180 may be configured to output the guide information (4-2 and 4 3 and 1 1) through the audio output unit 152 as a voice. The objects may include a building, a signboard (for instance, a coffee shop with a green signboard), a structure (a blue arch-shaped overpass), a car (for instance, a white medium-sized vehicle with a car number 34 Gu 1234) and the like. lux). The reference value (for instance, 10 lux) may be changed by a user or designer's intention.

The control unit 180 may be configured to propose a road guide to a new route which detours the route corresponding to the road guide information when a moving speed of the eyewear-type terminal is out of a reference value while the road guide information is output. For instance, the control unit 180 is configured to, when a moving speed of the eyewear-type terminal is gradually increased while the road guide information is output, recognize the current area as a dangerous area and propose a road guide to a new route which detours the route corresponding to the road guide information.

The control unit 180 may be configured to detect the number of persons (for instance, detect the number of persons or the number of faces) within images captured through the camera while the road guide information is output, and propose a road guide to a new route which detours the route corresponding to the road guide information when the detected number of persons is less than a reference value (for instance, one or two persons). For instance, the control unit 180 is configured to detect the number of persons within visual information which is captured real time through the camera 121 while the road guide information is output, recognize the current area as a dangerous area and propose a road guide to a new route which detours the route corresponding to the road guide information when the detected number of persons is less than a reference value (for instance, one or two persons).

The control unit 180 may be configured to propose a road guide to a new route which detours the route corresponding to the road guide information when a direction change (for instance, a direction change of a user's head) is repeated by a preset number of times (for instance, three to four times) for a preset time (for instance, 10-20 seconds) while the road guide information is output. For instance, the control unit 180 is configured to, when a user's head movements to look back several times is detected while the road guide information is output, recognize the current area as a dangerous area and propose a road guide to a new route which detours the route corresponding to the road guide information.

Figure 11A:
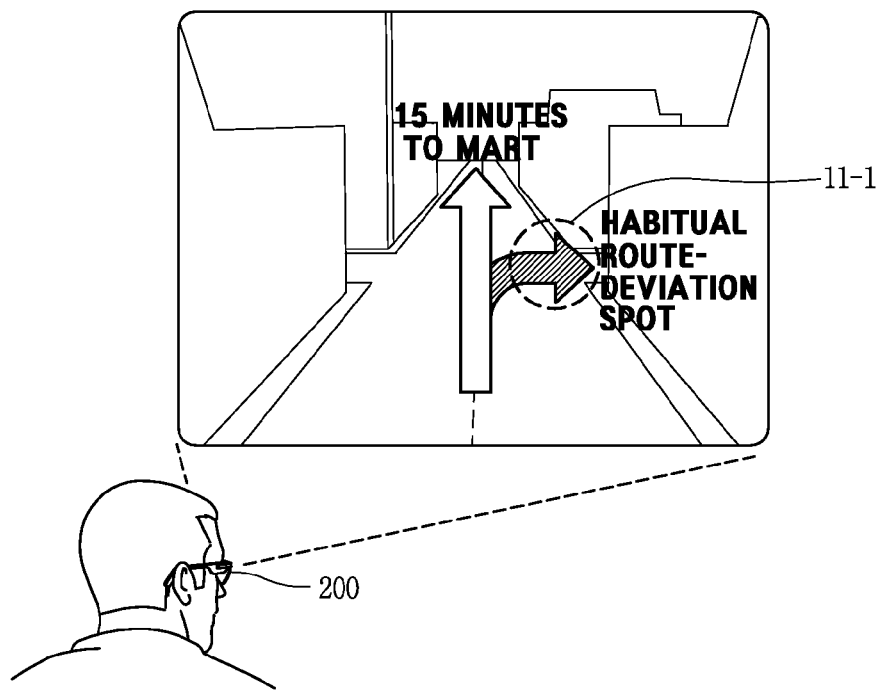
FIGS. 11A and 11B are exemplary views illustrating a method to inform a habitual route-deviation spot while outputting road guide information according to an embodiment of the present invention.
Figure 11B:
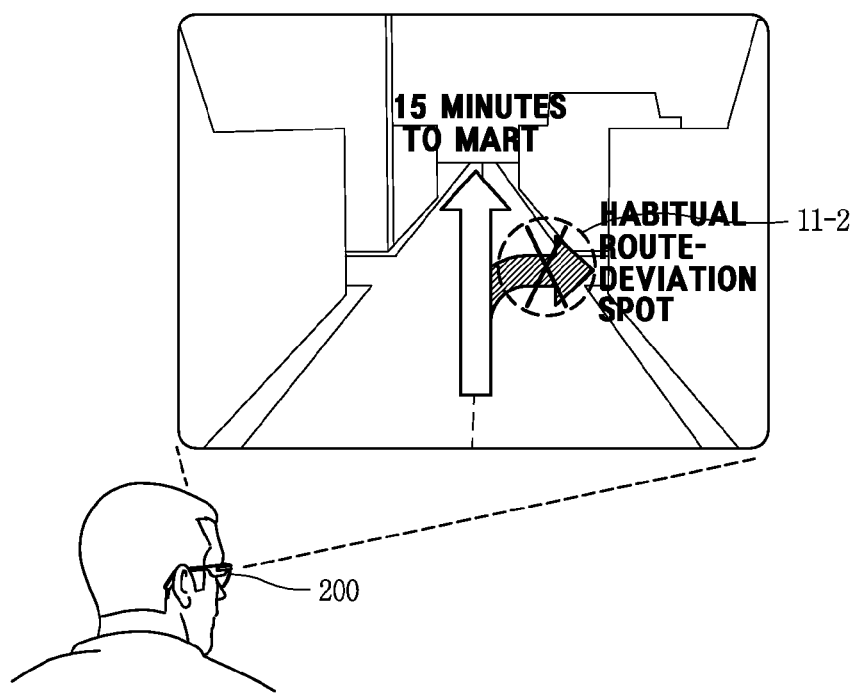

FIGS. 11A and 11B are exemplary views illustrating a method to inform a habitual route-deviation spot while outputting road guide information according to an embodiment of the present invention.

As shown in FIG. 11A, the control unit 180 is configured to, when a user deviates a specific spot repeatedly on a route corresponding to the road guide information while the road guide information is output, set the specific spot as a habitual route-deviation spot. The control unit 180 is configured to inform the user that the specific spot is a habitual route-deviation spot by outputting a highlight effect (11-1) to the specific spot (the habitual route-deviation spot) when the current position becomes closer to the habitual route-deviation spot while the road guide information is output. For instance, the control unit 180 is configured to inform the user that the specific spot is a habitual route-deviation spot by differently displaying a color of a turn-by-turn arrow indicative of a direction of the specific spot from a color of a turn-by-turn arrow indicative of a direction of the route, when the current position becomes closer to the habitual route-deviation spot while the road guide information is output.

As shown in FIG. 11B, the control unit 180 may further include a symbol (11-2) indicating "no entrance" to the turn-by-turn arrow which guides a direction toward the specific spot.

The control unit 180 may be configured to store visual information (moving image) at every junction section while the road guide information is output, and reproduce the visual information (moving image) corresponding to a previous section based on a time point when a user's non-recognition information has been detected or a route-deviation spot when a user's non-recognition information is detected or a route deviation occurs, so that a user may easily and promptly confirm (recognize) the reason of route-deviation.

As described above, the present invention is capable of implementing a computer readable code in a media in which programs are recorded. The computer readable media include all kinds of recording devices in which data readable by a computer system are stored. Examples of the computer readable media are a Hard Disk Drive (HDD), a Solid State Disk (SSD), a Silicon Disk Drive (SSD), a ROM, a RAM, a CD-ROM, a magnetic tape, a floppy disk, an optical data storage device, and include a type in the form of a carrier wave (for instance, transmission via internet). Further, the control unit 180 of the computer terminal may be included.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other features of the exemplary embodiments described herein may be combined in various ways to obtain additional and/or alternative exemplary embodiments.

As the present features may be embodied in several forms without departing from the features thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An eyewear-type mobile terminal, comprising:
    a camera;
    a display; and
    a controller configured to:
        acquire information about a current position;
        acquire road guide information for a route from the current position to a destination;
        cause the display to display the acquired road guide information in real-time;
        detect user's non-recognition information indicating that a user does not recognize a direction toward the destination while the road guide information is displayed;
        cause the camera to acquire visual information corresponding to a user's eyeline direction in real-time in response to the detected user's non-recognition information;
        recognize an object having a largest-sized text among a plurality of objects included in the acquired visual information;
        detect a difference between a direction of the recognized object and the direction toward the destination;
        generate guide information informing the direction toward the destination based on the difference between the direction of the recognized object and the direction toward the destination; and
        cause the display to display the generated guide information at a position adjacent to the recognized object.

2. The eyewear-type mobile terminal of claim 1, wherein the controller is further configured to:
    update the road guide information in real-time based on the position of the recognized object; and
    cause the display to display the updated road guide information with reference to the position of the recognized object.

3. The eyewear-type mobile terminal of claim 1, wherein the generated guide information displayed on the display includes turn-by-turn information.

4. The eyewear-type mobile terminal of claim 3, further comprising an audio output unit, wherein the controller is further configured to cause the audio output unit to output the generated guide information as a voice.

5. The eyewear-type mobile terminal of claim 1, wherein the controller is further configured to cause the display to apply a highlight effect to the recognized object within the acquired visual information.

6. The eyewear-type mobile terminal of claim 1, wherein the controller is further configured to cause the display to display an indicator at a periphery of the recognized object.

7. The eyewear-type mobile terminal of claim 1, wherein the controller is further configured to detect the user's non-recognition information when a user's head movement is recognized to be equal or similar to a preset movement pattern after the road guide information is output.

8. The eyewear-type mobile terminal of claim 1, wherein the controller is further configured to cause the camera to acquire the visual information when the mobile terminal is repeatedly moved more than a preset number of times at a specific section among a plurality of sections included in the road guide information within a preset period of time.

9. The eyewear-type mobile terminal of claim 1, wherein the controller is further configured to cause the camera to acquire the visual information when a moving speed of the mobile terminal is equal or similar to a preset speed while the road guide information is output.

10. The eyewear-type mobile terminal of claim 1, wherein the controller is further configured to cause the camera to acquire the visual information when a moving direction of the mobile terminal is changed a preset number of times within a preset time period while the road guide information is output.

11. The eyewear-type mobile terminal of claim 1, wherein the controller is further configured to cause the camera to acquire the visual information when a user's heart rate is out of a reference range while the road guide information is output.

12. The eyewear-type mobile terminal of claim 1, wherein the controller is further configured to:
    search a passing spot located at a specific direction in response to a user's gesture indicating the specific direction and the passing spot; and
    update the route from the current position to the searched passing spot.

* * * * *